US007299914B2

(12) United States Patent
Chung et al.

(10) Patent No.: US 7,299,914 B2
(45) Date of Patent: Nov. 27, 2007

(54) ROLLER ASSEMBLY FOR IMAGE FORMING APPARATUS

(75) Inventors: Kyung-shig Chung, Suwon-si (KR); Sung-hoon Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/430,851

(22) Filed: May 10, 2006

(65) Prior Publication Data

US 2007/0017785 A1 Jan. 25, 2007

(30) Foreign Application Priority Data

Jul. 23, 2005 (KR) ..................... 10-2005-0067096

(51) Int. Cl.
*B65G 13/02* (2006.01)

(52) U.S. Cl. ........................................ 198/780; 193/37

(58) Field of Classification Search ................ 198/780, 198/782–788, 789; 193/37
See application file for complete search history.

(56) References Cited

U.S. PATENT DOCUMENTS

| | | | | |
|---|---|---|---|---|
| 4,852,230 | A * | 8/1989 | Yu | 193/37 |
| 6,702,091 | B2 * | 3/2004 | Nimmo et al. | 193/37 |
| 2005/0205388 | A1 * | 9/2005 | Whipple et al. | 193/37 |

FOREIGN PATENT DOCUMENTS

| | | |
|---|---|---|
| JP | 01-123273 | 5/1989 |
| JP | 05-312211 | 11/1993 |
| JP | 08-305211 | 11/1996 |
| JP | 10-009254 | 1/1998 |
| JP | 2005-091545 | 4/2005 |
| KR | 1998-0009301 | 4/1998 |
| KR | 1999-0015200 | 5/1999 |

* cited by examiner

*Primary Examiner*—James R. Bidwell
(74) *Attorney, Agent, or Firm*—Roylance, Abrams, Berdo & Goodman LLP

(57) ABSTRACT

A roller assembly for an image forming apparatus includes a roller, a bearing for rotatably supporting the roller, a roller cover to be assembled at both ends of the roller, a bushing to be introduced between the roller and the bearing, and a support unit disposed at the roller and the bushing to suppress sliding movement between the roller and the bushing and shaking of the roller in an axial direction.

19 Claims, 4 Drawing Sheets

ROLLER ASSEMBLY FOR IMAGE FORMING APPARATUS

CROSS-REFERENCE TO RELATED APPLICATIONS

This application claims the benefit under 35 U.S.C. § 119(a) of Korean Patent Application No. 2005-67096, filed on Jul. 23, 2005, the entire content of which is hereby incorporated by reference.

BACKGROUND OF THE INVENTION

1. Field of the Invention

The present invention relates generally to a roller assembly used for an image forming apparatus. More particularly, the present invention relates to a roller assembly which is capable of reducing driving noise caused by a heating roller and has an improved structure to reduce shaking of the heating roller caused by axial thrusting.

2. Description of the Related Art

Typically, an image forming apparatus has a plurality of roller assemblies to perform various functions and operations. FIGS. 1 and 2 show a heating roller of a fusing unit, which is an example of a roller assembly disposed in the image forming apparatus.

As shown in FIG. 1, a heating roller 10 is rotatably disposed in a frame 1. A bearing 30 is disposed at each end 11 of the heating roller 10 to rotatably support the heating roller 10.

As shown in FIG. 2, the heating roller 10 is assembled with the bearing 30 with an insulating bushing 20 in order to prevent the bearing 30 from being damaged by heat generated by a heater disposed inside the heating roller 10. That is, both ends 11 of the heating roller 10 are inserted and fitted into an inner circumferential surface of the bushing 20, and the bushing 20 is connected with an inner rim 31 of the bearing 30. A roller cover 12 at which a terminal unit is disposed is assembled at both ends of the heating roller 10.

As shown in FIG. 3, a pressure roller 40 is disposed in contact with the heating roller 10 and is rotated by applying pressure to the heating roller 10 in the arrow direction as shown. If the pressure is continuously applied to the bushing 20, it may cause deformation of the bushing 20. A slight change in the dimensions resulting from the deformation of the bushing 20 may degrade the connection force of the ends 11 of the heating roller 10 with the bushing 20. Thus, the heating roller 10 and the bushing 20 may slide with respect to each other, that is, from the connection portion S as shown, and may generate frictional noise.

Furthermore, upon rotation of the heating roller 10, axial thrust is generated (that is, thrust toward the ends 11 in an axial direction) and the heating roller 10 may shake from side to side due to the axial thrust. When the heating roller 10 shakes, the torque required to drive the heating roller 10 increases. If the required torque is too great, the frame 1 may by stressed enough that the frame 1 is deformed.

Accordingly, there is a need for an improved roller assembly for supporting a roller, such as a heating roller, with less noise and with reduced shaking.

SUMMARY OF THE INVENTION

An aspect of the present invention is to address at least the above problems and/or disadvantages and to provide at least the advantages described below. Accordingly, an aspect of the present invention is to provide a roller assembly for an image forming apparatus, which is capable of reducing driving noise caused by a heating roller and has an improved structure to reduce shaking of the heating roller caused by axial thrust.

In accordance with an aspect of the present invention, a roller assembly for an image forming apparatus comprises a rotatable roller, a bearing for rotatably supporting the roller, a roller cover assembled at both ends of the roller, a bushing positioned between the roller and the bearing, and a support unit for suppressing sliding movement betweens the roller and the bushing and shaking of the roller in an axial direction, the support unit being disposed at each of the roller cover and the bushing.

According to an exemplary embodiment of the present invention, the roller may be a heating roller.

The bushing may be made of an insulating plastic and assembled with an inner rim of the bearing to rotate with the roller.

The support unit may comprise at least one first protrusion formed on the roller cover, a second protrusion formed on the roller cover to support an end surface of the bushing so as to fix a position of the roller in an axial direction, and a protrusion receiving groove formed in the bushing such that the first protrusion is inserted into the protrusion receiving groove. The first protrusion may comprise a connection groove into which an end of the roller is inserted.

In accordance with another aspect of the present invention, a roller assembly for an image forming apparatus comprises a rotatable roller, a bearing for rotatably supporting the roller, a bushing positioned between the roller and the bearing, and a roller cover assembled at both ends of the roller. At least one protrusion receiving groove may be formed in the bushing, and a first protrusion to be inserted into the protrusion receiving groove of the bushing and a second protrusion to support the bushing may be formed on the roller cover. The first protrusion may comprise a connection groove into which the end of the roller is inserted.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 4:
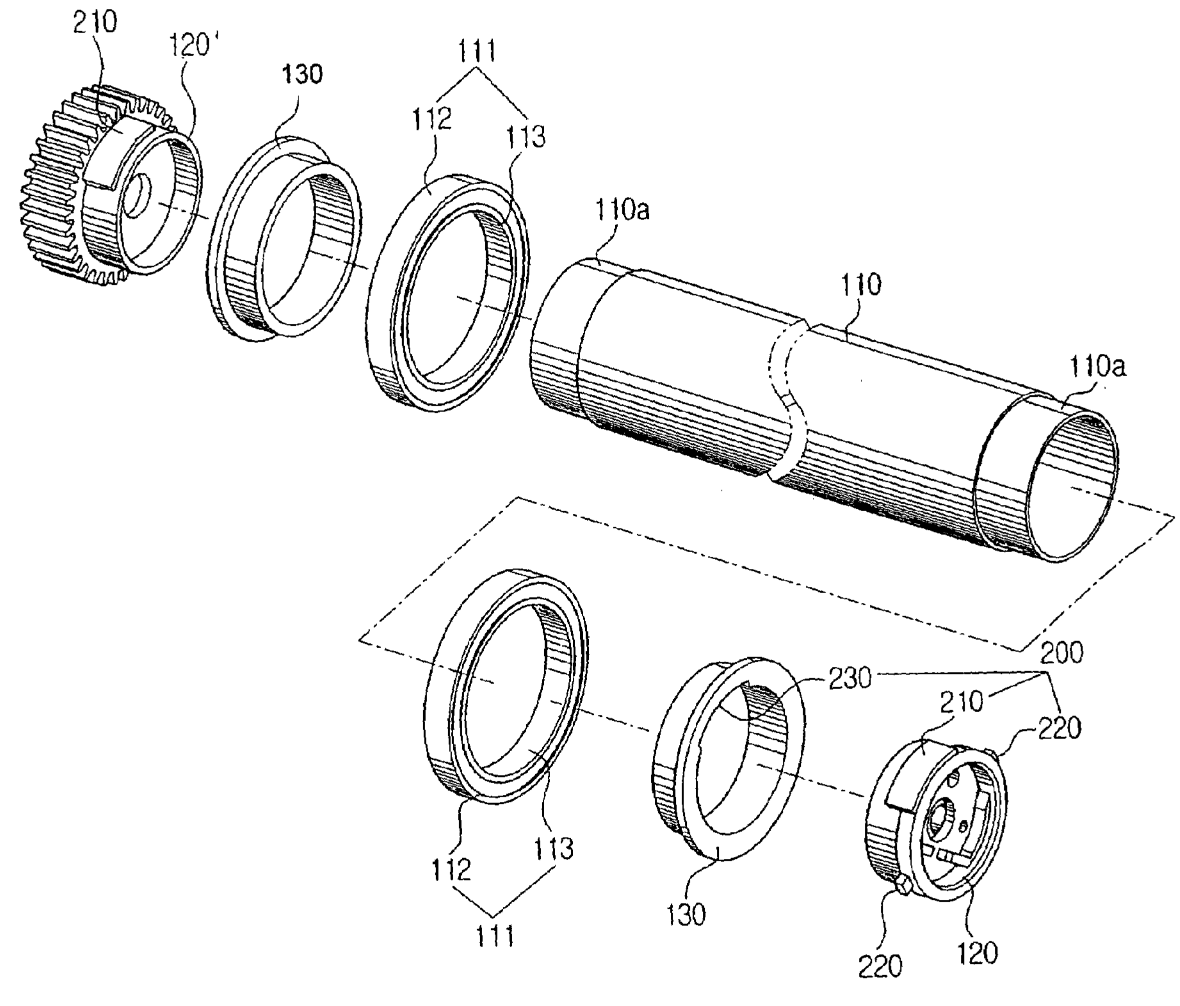
FIG. 4 is an exploded, perspective view of a roller assembly for an image forming apparatus according to one exemplary embodiment of the present invention.

A roller assembly for an image forming apparatus according to an exemplary embodiment of the present invention will now be described in more detail, with reference with the included drawings. FIG. 4 is an exploded perspective view of a roller assembly for an image forming apparatus according to an exemplary embodiment of the present invention.

As shown, the roller assembly comprises a roller 110, a roller cover 120, a bushing 130 and a support unit 200.

Figure 1:
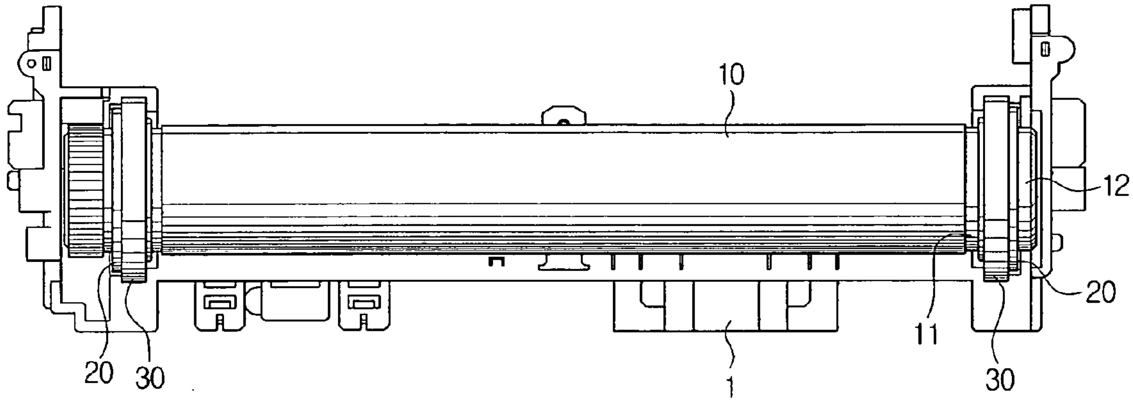
FIG. 1 (PRIOR ART)
FIG. 1 shows an example of a convention roller assembly for an image forming apparatus, which is a heating roller for a fusing unit.
Figure 2:
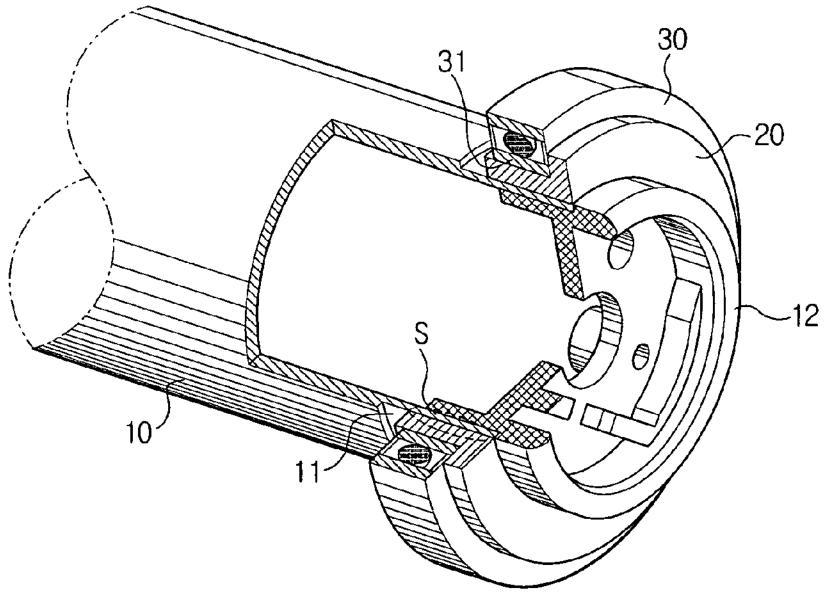
FIG. 2 (PRIOR ART)
FIG. 2 is a partially cut-away perspective view of the heating roller of FIG. 1.
Figure 3:
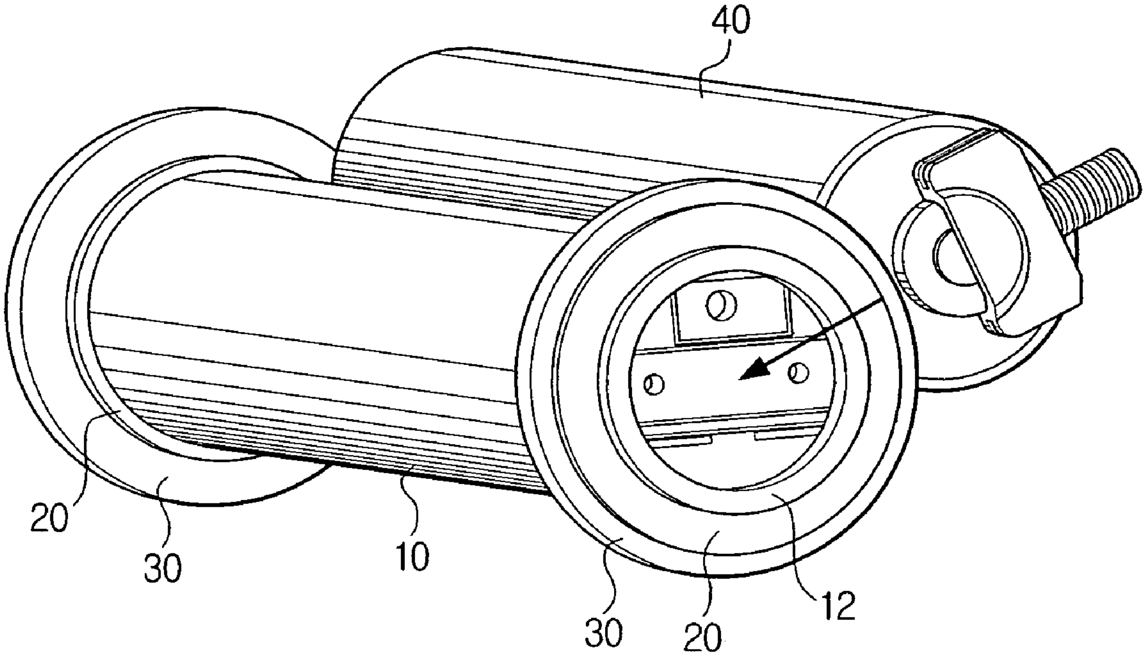
FIG. 3 (PRIOR ART)
FIG. 3 is a perspective view of the heating roller of FIG. 1 which is engaged with a pressure roller so that they rotate together inside the fusing unit.

The roller 110 is rotatably disposed in a frame (not shown) by a bearing 111, which is connected with both ends 110*a* of the roller 110*a*. According to an exemplary embodiment of the present invention, the roller 110 is a heating roller which is disposed in a fusing unit to heat a printed paper to a high temperature, and the bearing 111 is a ball bearing including an outer rim 112 to be fixed on a fusing unit frame 1 (referring to FIG. 1) and an inner rim 113 which is rotatable about the outer rim 112.

The roller cover 120 is assembled to both ends 110*a* of the roller 110. The roller cover 120 includes a terminal to supply power to parts such as a heater disposed in the inside of the roller 110.

The bushing 130 is introduced between the roller 110 and the bearing 111 such that the heat of the roller heated by the heater does not transfer to the bearing 111. For this purpose, the bushing 130 is made of a material such as an insulating PPC. To elaborate, the bushing 130 is formed in a ring shape as shown in FIG. 4, wherein the roller 110 is inserted and fitted into the inner circumferential surface of the bushing 130 and the inner rim 113 of the bearing 111 is assembled with the outer circumferential surface of the bushing 130.

The support unit 200 is complementarily disposed at each of the roller cover 120 and the bushing 130 and comprises a first protrusion 210, a second protrusion 220 and a protrusion receiving groove 230.

Figure 5:
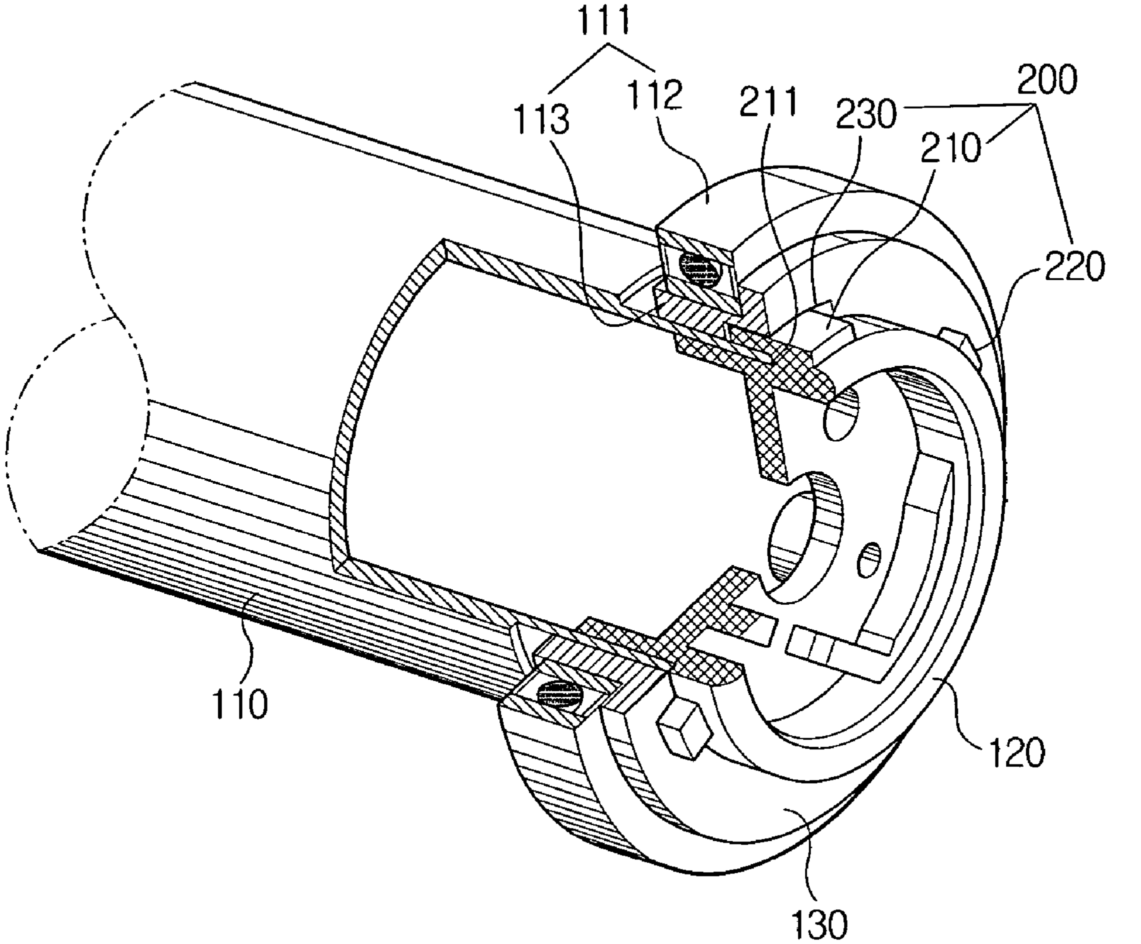
FIG. 5 is a partially cut-away perspective view of the roller assembly of FIG. 4.

The first protrusion 210 may be formed to be integral with the roller cover 120 as shown in FIG. 5 and inserted into the protrusion receiving groove 230 formed in the bushing 130. The first protrusion 210 is provided with a connection groove 211 where the end of the roller 110 is inserted and connected. With the first protrusion 210 formed in the above manner, the roller cover 120 engages both the roller 110 and the bushing 130, thereby preventing the bushing 130 from sliding from the ends 110*a* of the roller 110. Although a single first protrusion 210 and protrusion receiving groove 230 is illustrated, one skilled in the art will appreciate that this is just an example, and a plurality of first protrusions and protrusion receiving grooves may be used in accordance with the size of the roller 110.

The second protrusion 220 suppresses shaking of the roller 110 in an axial direction, and, in the illustrated embodiment, a plurality of second protrusions 220 project from the roller cover 120 and support an end surface of the bushing 130. The second protrusion 220 is provided in the roller cover 120 to be assembled with both ends 110*a* of the roller 110.

The operation of the roller assembly for an image forming apparatus according to the exemplary embodiment of the present invention will now be described, with reference to the included drawings. As shown in FIG. 5, the roller assembly of the present invention may be used with any roller 110 of the image forming apparatus which is assembled to be rotatable by the bearing 111. Therefore, a heating roller disposed in the fusing unit which is heated to a high temperature will be used as an example in the following description.

Both ends 110*a* of the roller 110 heated at the high temperature are assembled at the inner rim 112 of the bearing 111 by the introduction of the bushing 130 made of insulating materials such as a PPC. This is to prevent the heat of the roller 110 from being transferred to the bearing 111, so that the bearing 111 is not damaged by the heat.

Upon rotation, the roller 110 disposed to be rotatable by the bearing 111 may cause frictional noise and may shake in the axial direction due to sliding of the connection portion between the ends 110*a* of the roller 110 and the bushing 130. However, the frictional noise and shaking in the axial direction is suppressed by the support unit 200.

That is, upon rotation, the rotational torque generated between the ends 110*a* of the roller 110 and the bushing 130 may deform the bushing and allow the bushing 130 to slide with respect to the ends 110*a* of the roller 110. It is possible to suppress this sliding movement by the engagement force of the first protrusion 210 formed on the roller cover 120 and the protrusion receiving groove 230 formed in the bushing 130. In other words, as the first protrusion 210 engages the protrusion receiving groove 230 to fix the position where the bushing 130 is disposed, it is possible to prevent the bushing 130 from sliding from the ends 110*a*.

Further, as the second protrusion 220 supports the end surface of the bushing 130, it is possible to suppress shaking of the roller 110 in the axial direction. That is, if the thrust in the axial direction is generated by the rotation of the roller since the outer rim 112 of the bearing 111 is fixed on the frame 1 (referring to FIG. 1), the thrust is applied to the connection surface between the ends 110*a* and the bushing 130, thereby causing the bushing 130 to slide and the roller 110 to shake. As the second protrusion 220 is formed to be integral with the roller cover 120 to be connected with the both ends 110*a* of the roller 110, even though axial thrust is generated, the second protrusion 220 supports the roller 110 and the bushing 130 to maintain the original connection position in the axial direction, thereby suppressing the shaking of the roller 110. In an exemplary embodiment, two second protrusions 220 may be used, as illustrated as in FIG. 5. However, a single second protrusion or a larger number of second protrusions may be used in accordance with the size of the roller 110.

In another exemplary embodiment of the present invention, as shown in FIG. 4, a second type of roller cover 120' may be provided at one end (the left end in the illustration) of the roller 110. The roller cover 120' has a similar configuration to the roller cover 120, except that it has a plurality of gear teeth which may be driven by a gear train (not shown) to rotate the roller 110. The roller cover 120' has a first protrusion 210 which mates with a protrusion receiving groove 230 in the bushing 130. The gear teeth of the roller cover 120' serve the same function as the second protrusions of the first embodiment of the roller cover 120. That is, the gear teeth support the end surface of the bushing 130, so that it is possible to suppress shaking of the roller 110 in the axial direction.

According to the exemplary embodiments of the present invention, it is possible to prevent frictional noise that occurs when the roller cover and the bushing slide and to suppress shaking of the roller and/or deformation of the frame which is caused by axial thrust, since the thrust generated by the rotation of the roller is offset by the engagement force of the roller cover and the bushing.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A roller assembly for an image forming apparatus comprising:

a rotatable roller;

a bearing for rotatably supporting said roller;

a roller cover assembled at both ends of said roller;

a bushing positioned between said roller and said bearing; and a support unit for suppressing sliding movement between said roller and said bushing and, for suppressing shaking of said roller in an axial direction, the support unit being disposed at each of said roller cover and said bushing.

2. The apparatus as claimed in claim 1, wherein said roller comprises a heating roller.

3. The apparatus as claimed in claim 1, wherein said bushing comprises an insulating plastic.

4. The apparatus as claimed in claim 3, wherein said bushing is assembled at an inner rim of said bearing to rotate with said roller.

5. The apparatus as claimed in claim 1, wherein said support unit comprises:

at least one first protrusion disposed on said roller cover;

a second protrusion disposed on said roller cover to support an end surface of said bushing so as to fix a position of said roller in an axial direction; and a protrusion receiving groove disposed in said bushing for accommodating said first protrusion in said protrusion receiving groove.

6. The apparatus as claimed in claim 5, wherein said first protrusion comprises a connection groove for accommodating an end of said roller.

7. A roller assembly for an image forming apparatus comprising:

a rotatable roller;

a bearing for rotatably supporting said roller;

a bushing positioned between said roller and said bearing, said bushing comprising at least one protrusion receiving groove disposed in said bushing; and a roller cover assembled at both ends of said roller, said roller cover comprising at least one first protrusion for insertion into said protrusion receiving groove of said bushing and a second protrusion for supporting said bushing.

8. The apparatus as claimed in claim 7, wherein said roller comprises a heating roller.

9. The apparatus as claimed in claim 7, wherein said bushing comprises an insulating plastic.

10. The apparatus as claimed in claim 7, wherein said bushing is assembled at an inner rim of said bearing to rotate with said roller.

11. The apparatus as claimed in claim 7, wherein said first protrusion comprises a connection groove for accommodating an end of said roller.

12. A roller assembly for an image forming apparatus comprising:

a rotatable roller;

a bearing for rotatably supporting said roller;

a roller cover assembled at both ends of said roller;

a bushing positioned between said roller and said bearing;

means for suppressing sliding movement between said roller and said bushing; and means for suppressing shaking of said roller in an axial direction.

13. The apparatus as claimed in claim 12, wherein the means for suppressing sliding movement between said roller and said bushing comprises:

at least one first protrusion disposed on said roller cover; and a protrusion receiving groove disposed in said bushing for accommodating said first protrusion.

14. The apparatus as claimed in claim 13, wherein said first protrusion comprises a connection groove for accommodating an end of said roller.

15. The apparatus as claimed in claim 13, wherein the means for suppressing shaking of said roller in an axial direction comprises a second protrusion disposed on said roller cover to support an end surface of said bushing.

16. The apparatus as claimed in claim 12, wherein said roller comprises a heating roller.

17. The apparatus as claimed in claim 12, wherein said bushing comprises an insulating plastic.

18. The apparatus as claimed in claim 12, wherein said bushing is assembled at an inner rim of said bearing to rotate with said roller.

19. A roller assembly for an image forming apparatus, comprising:

a rotatable roller;

a bearing rotatably supporting the roller;

a roller cover assembled at opposing ends of the roller;

a bushing positioned between the roller and the bearing; and a support unit suppressing rotational movement between the roller and the bushing, and suppressing axial shaking of said roller, portions of the support unit being disposed, correspondingly, on the roller cover and the bushing.

* * * * *